United States Patent
Kim et al.

(10) Patent No.: US 8,611,425 B2
(45) Date of Patent: Dec. 17, 2013

(54) METHOD AND SYSTEM FOR PROVIDING MULTICAST AND BROADCAST SERVICE USING SCALABLE VIDEO CODING

(75) Inventors: Ju Heon Kim, Gunpo-si (KR); Chung Gu Kang, Seoul (KR); Jin Woo Kim, Seoul (KR); Jin Su Jung, Gunpo-si (KR); Yong In Choi, Jeongeup-si (KR)

(73) Assignee: KT Corporation, Seongnam-Si (KR)

( * ) Notice: Subject to any disclaimer, the term of this patent is extended or adjusted under 35 U.S.C. 154(b) by 151 days.

(21) Appl. No.: 13/304,520

(22) Filed: Nov. 25, 2011

(65) Prior Publication Data

US 2012/0163268 A1 Jun. 28, 2012

(30) Foreign Application Priority Data

Nov. 25, 2010 (KR) ........................ 10-2010-0118407

(51) Int. Cl.
*H04N 7/12* (2006.01)

(52) U.S. Cl.
USPC ..................................... 375/240.16; 370/312

(58) Field of Classification Search
USPC ........ 375/240.16, 240.23, 240.24; 370/310.2, 370/312, 328, 338, 349
See application file for complete search history.

(56) References Cited

U.S. PATENT DOCUMENTS 8,189,659 B2 * 5/2012 Han et al. ................. 375/240.02
2009/0059010 A1 * 3/2009 Wang et al. .................... 348/180

FOREIGN PATENT DOCUMENTS

KR 10-2008-0023535 A 3/2008
KR 10-2010-0006421 A 1/2010

* cited by examiner

*Primary Examiner* — Brenda H Pham
(74) *Attorney, Agent, or Firm* — Sughrue Mion, PLLC

(57) ABSTRACT

A method and system for efficiently transmitting data, to which scalable image coding has been applied over a single frequency network is provided. The system includes a control server which re-packetizes data packets, received from a multimedia server, into a scalable bit stream by separately encoding the data packets into a base layer and one or more enhancement layers, and at least one base station which adaptively multicasts and broadcasts the scalable bit stream, received from the control server, to a plurality of terminals located in the area of a cell. The at least one base station multicasts and broadcasts the base layer across the area of the cell, and adaptively transmits the one or more enhancement layers depending on channel status or terminal performance of the plurality of terminals.

11 Claims, 9 Drawing Sheets

METHOD AND SYSTEM FOR PROVIDING MULTICAST AND BROADCAST SERVICE USING SCALABLE VIDEO CODING

This application claims priority from Korean Patent Application No. 10-2010-0118407, filed on Nov. 25, 2010 in the Korean Intellectual Property Office, the disclosure of which is incorporated herein by reference.

BACKGROUND

1. Field

Embodiments relates generally to a method for improving the performance of multicast and broadcast service and, more particularly, to a method and system for efficiently transmitting data, to which scalable image coding has been applied over a single frequency network.

2. Description of the Related Art

With the dramatic developments in computer, electronic and communication technology, a variety of wireless communication services have been provided over wireless communication networks. Accordingly, voice service-centered basic communication systems, which provide a wireless voice call service to the users of mobile communication terminals, have evolved into communication systems capable of providing an image data service and a variety of multimedia services.

Voice service-centric communication systems cannot meet rapidly increasing demands for service because transmission bandwidth is narrow and service charges are expensive. Furthermore, since there is an increased need for communication systems capable of efficiently providing Internet service due to the development of communication business and an increase in user demands for Internet service, Orthogonal Frequency Division Multiplexing (OFDM)-based wireless communication systems have been introduced.

Wireless communication systems are used to provide important services, i.e., Internet service, Voice over IP (VoIP) service, and streaming services. Recently, broadcast services are rapidly increasing. The broadcast services provide high-quality image data in real time using a Multicast and Broadcast Service (MBS) technique regardless of time and place.

MBS is capable of providing image services, i.e., a news service, a drama service, and a sports relay broadcast service, and data services, i.e., a radio music broadcast service and real-time traffic information. MBS is also capable of simultaneously transmitting a variety of channels at high transmission rates using a macro-diversity technique.

A mobile internet protocol television (IPTV) service provides high-image quality video and high-sound quality audio. The mobile IPTV service is an example of a broadcast service using MBS, and is emerging as a principal service of fourth-generation mobile communication systems. IPTV is a service which provides information, moving image content, and broadcasts to televisions (TVs) over an internet protocol (IP) network, i.e., the high-speed Internet. Mobile IPTV is integrated with two-way system operation enabling networking via TVs.

FIG. 1 is a diagram illustrating an example of the configuration of a typical mobile IPTV broadcasting network. FIG. 1 is a broadcasting network which provides services using a MBS technique.

Referring to FIG. 1, a base station 100 for providing mobile TV service provides user terminals 120 with the mobile IPTV service over a wireless communication network, i.e., a WiBro, 3GPP or LTE network, in conjunction with an STB-IPTV 110.

In order to improve the performance of a wireless access network, a variety of technologies and IPTV broadcasting network configuration and control technologies for the control of IPTV broadcast service are required. For example, in order to improve the performance of a wireless access network, a Single Frequency Network (SFN) and Fractional Frequency Reuse (FFR) may be utilized. Furthermore, examples of what is required by the IPTV broadcast service control technology are a Scalable Video Coding (SVC) technique using an adaptive module and an Adaptive Modulation and Coding (AMC) technique, multi-carrier technology for ensuring a multi-TV channel, and wireless link control technology in an MBS environment.

Of the above technologies, the SFN technique is a method of transmitting broadcast signals to adjacent areas at the same frequency in OFDM digital transmission. The SFN technique is chiefly used in terrestrial DMB broadcasting. The use of the SFN technique can reduce inter-cell interference attributable to the use of the same frequency and can also reduce the frequency of handovers. Thus, a high-quality mobile IPTV service is ensured.

FIG. 2 is a diagram illustrating the configuration of an MBS zone in a related art wireless communication system.

Referring to FIG. 2, the wireless communication system of the related art builds a single MBS zone using 7 base stations located in an area where broadcasting service is provided, in order to apply a macro-diversity technique. The term "MBS zone" refers to a specific area where the MBS service is provided. An area each base station provides service is referred to as a cell or a sector. An MBS zone may include one or more cells or sectors where one or more base stations provide MBS service.

A wireless communication network which is used to provide IPTV service in such an MBS zone may include, for example, an International Mobile Telecommunications-Advanced (IMT-Advanced) next generation mobile communication technology network, a 3rd Generation Partnership Project (3GPP) network, and a Long Term Evolution (LTE) network.

IMT-Advanced next generation mobile communication technology is intended to support a data transfer rate of 100 Mbps during high-speed movement at a speed equal to or higher than 60 km/h, and a data transfer rate of 1 Gbps at rest or during low-speed movement. IMT-Advanced also provides a demand-specific wired and wireless and broadcasting and communication convergence mobile multimedia service via personal portable terminals. IEEE 802.16 will now be described as a standard of IMT-Advanced technology.

The Institute of Electrical and Electronics Engineers (IEEE) is a U.S.-centric international standardization organization, and establishes an 802.16 family, which is called "Worldwide Interoperability for Microwave Access (WiMAX)." The IEEE 802.16 working group originally established a standard for point-to-point microwave transmission, introduced Orthogonal Frequency Division Multiplexing (OFDM) technology in order to ensure reliable transmission in a Non-Line-Of-Sight (NLOS) environment, and established IEEE 802.16-2004. IEEE 802.16-2004 is called "Air Interface for Fixed Broadband Wireless Access System," and was established in 2004. The IEEE 802.16 working group established IEEE 802.16e-2005 (hereinafter referred to as "16e"), called "Mobile Broadband Wireless Access System" in which mobility was added to IEEE 802.16-2004. A so-called Wireless Broadband ("Wibro") system is compatible with a 16e system. The Wibro system supports a bandwidth of 8.75 MHz, whereas 16e supports bandwidths of 3 MHz, 5 MHz, 7 MHz, 8.75 MHz, and 10 MHz. IEEE is working on the standardization of IEEE 802.16m (hereinafter referred to as "16m"), called "Advanced Air Interface with data rates of 100 Mbit/s mobile & 1 Gbit/s fixed." In regard to 16m, a more evolved Enhanced Multicast and Broadcast Service (E-MBS) standard to which the MBS technique illustrated in FIG. 2 has been introduced in order to support broadcast service.

FIG. 3 is a diagram illustrating an example of a frame structure in compliance with IEEE 802.16 in a related art wireless communication system.

Referring to FIG. 3, in IEEE 802.16, each superframe includes 4 frames of the same size, and each frame includes 8 subframes. Each subframe may be assigned to any one of an uplink and a downlink. Although not shown in the drawing, each subframe includes 7 Orthogonal Frequency Division Multiplexing Access (OFDMA) symbols.

As shown in FIG. 3, when an E-MBS subframe is transmitted, each frame may be configured in a fixed pattern such that the E-MBS subframe is assigned to any one of 8 subframes.

As described above, a variety of schemes for efficiently utilizing a frequency band in order to efficiently provide an MBS service in a wireless communication system have been proposed. One of these schemes provides MBS using the above-described SFN technique.

When MBS is provided using the SFN technique, the Signal to Interference Plus Noise Ratio (SINR) value of users located in an SFN zone increases. Thus, high-data rate Adaptive Modulation and Coding (AMC) mode can be selected, increasing frequency efficiency. In contrast, base stations located in an SFN zone cannot flexibly utilize a frequency band. Base stations located in an SFN zone utilize the frequency band for the SFN zone in a fixed manner. For example, when the SFN technique is utilized, service is always provided over the frequency band. Even when there is no user in the SFN zone, service is always provided in the SFN technique. Furthermore, when data encoded by the Scalable Video Coding (SVC) technique is transmitted to all users located in the SFN zone, increasing overhead occurs. Increasing overhead occurs when data is encoded by the SVC technique in the SFN zone due to unusable data in the performance of a user terminal.

SUMMARY

Accordingly, one or more exemplary embodiments provides a method and system for efficiently transmitting data, to which scalable image coding has been applied, over a single frequency network, which are capable of, when providing MBS service, providing optimized Quality of Service (QoS) to users while efficiently and flexibly utilizing a frequency resource.

In detail, exemplary embodiments provide a method and system for efficiently transmitting data, to which scalable image coding has been applied over a single frequency network. When providing an MBS service, the method and system for efficiently transmitting data are capable of dividing a video data resource into a plurality of layers (a base layer and one or more enhancement layers) using an SVC technique and allowing each base station to flexibly transmit data. Thus, the method and system for providing MBS using SVC improves data transfer rate and has an efficient use of a frequency band.

According to an aspect of an exemplary embodiment, there is provided a method of providing multicast and broadcast service in a system including a base station, the system multicasting and broadcasting data to which scalable video coding has been applied, the method including grouping a plurality of terminals, located in an area of a cell, into at least one terminal group depending on channel status or performance of the plurality of terminals; and adaptively modulating and channel-coding a scalable bit stream, to which scalable video coding has been applied, depending on channel status or terminal performance of the at least one terminal group and transmitting the bit stream; wherein the scalable bit stream comprises a base layer multicast across the area of the cell and one or more enhancement layers selectively transmitted depending on the channel status or the terminal performance of the at least one terminal group.

The method may further include encoding by a control server of the system, image data received from a multimedia server of the system, into the scalable bit stream; and the transmitting by the control server, the scalable bit stream to the base station.

The base station may multicast and broadcast the base layer across the area of the cell using an identical resource and an identical channel modulation method at an identical time.

When the base station transmits the enhancement layers, the base station may transmit overlaid enhancement layers, a number of enhancement layers being proportional to the channel status of the at least one terminal group.

According to an aspect of another exemplary embodiment, there is provided a system for multicasting and broadcasting data to which scalable video coding has been applied, the system including a control server which re-packetizes data packets, received from a multimedia server, into a scalable bit stream by separately encoding the data packets into a base layer and one or more enhancement layers; and at least one base station which adaptively modulates and broadcasts the scalable bit stream, received from the control server, to a plurality of terminals located in an area of a cell; wherein the at least one base station multicasts and broadcasts the base layer across the area of the cell, and adaptively transmits the one or more enhancement layers depending on channel status or terminal performance of the plurality of terminals.

The at least one base station may group the plurality of terminals, located in the area of the cell, into at least one terminal group depending on the channel status or the performance of the plurality of terminals.

The at least one base station may transmit overlaid enhancement layers, the number of enhancement layers being proportional to the channel status of the at least one terminal group.

The at least one base station may multicast and broadcast the base layer across the area of the cell using an identical resource and an identical channel modulation method at an identical time.

According to an aspect of another exemplary embodiment, there is provided a base station for multicasting and broadcasting data to which scalable video coding has been applied, the base station including a transmitting module which transmits data; a receiving module which receives a scalable bit stream to which the scalable video coding has been applied; and a processor which groups a plurality of terminals, located in an area of a cell where the base station provides service, into at least one terminal group depending on channel status or performance of the terminals, and adaptively modulates and channel-codes the scalable bit stream depending on channel status or performance of the groups of terminals; wherein the scalable bit stream comprises a base layer multicast across the area of the cell and one or more enhancement layers selectively transmitted depending on channel status or terminal performance of the at least one terminal group.

The processor may multicast and broadcast the base layer across the area of the cell via the transmitting module using an identical resource and an identical channel modulation method at an identical time.

The processor may transmit overlaid enhancement layers, the number of enhancement layers being proportional to the channel status and the performance of the at least one terminal group.

According to an aspect of another exemplary embodiment, there is provided a method of providing a scalable video coding to video data, the method including quantizing the video data transmitted in an initial bit stream, dividing the quantized video data into a base layer and a plurality of enhancement layers, encoding the base layer and the plurality of enhancement layers into a reconstructed bit stream, and transmitting the reconstructed bit stream to at least one terminal group depending on channel status or terminal performance of the at least one terminal group.

The reconstructed bit stream may comprise only the base layer.

The reconstructed bit stream may comprise the base layer and one or more enhancement layers, the one or more enhancement layers being less in number than the plurality of enhancement layers.

The reconstructed bit stream may comprise the base layer and the plurality if enhancement layers.

At least one selected terminal group of the at least one terminal group may receive the reconstructed bit stream comprising the base layer and the plurality of enhancement layers, and the at least one selected terminal group may restore all of a data of the initial bit stream such that an image quality of the reconstructed bit stream is substantially similar to an image quality of the initial bit stream.

BRIEF DESCRIPTION OF THE DRAWINGS

The above and other objects, features and advantages of embodiments will be more clearly understood from the following detailed description taken in conjunction with the accompanying drawings, in which.

DESCRIPTION OF THE EXEMPLARY EMBODIMENTS

Although embodiments may be modified in various manners and have a variety of embodiments, specific embodiments are illustrated in the accompanying drawings and will be described in detail below. If it is determined that detailed descriptions of related art and well-known technologies are not needed, they will be omitted below.

Although the terms "first" and "second" may be used to describe a variety of elements, the elements are not limited by the terms, and the terms are used only to distinguish the elements from other elements.

Exemplary embodiments will be described in detail below with reference to the accompanying drawings. The detailed description, along with the accompanying drawings, are intended to describe the illustrative embodiments, and are not intended to show all embodiments which can be put into practice. Although the following detailed description includes details that will help the reader fully understand, those skilled in the art will appreciate that embodiments can be practiced without requiring the details.

Recently, with the advent of a scheme for providing intelligent broadcast content in a broadcasting and communication convergence environment, a variety of methods for providing optimum service to a variety of terminals in network environments have been researched.

An SVC technique is used as a method designed to configure a single piece of image content in the form of a bit stream. The SVC technique allows a variety of spatial resolutions, a variety of image qualities, a variety of frame rates (that is, which provides all of spatial, image-quality and temporal scalabilities), and enables a plurality of terminals to receive the bit stream and restore appropriate data depending on the terminal performance.

Figure 1:
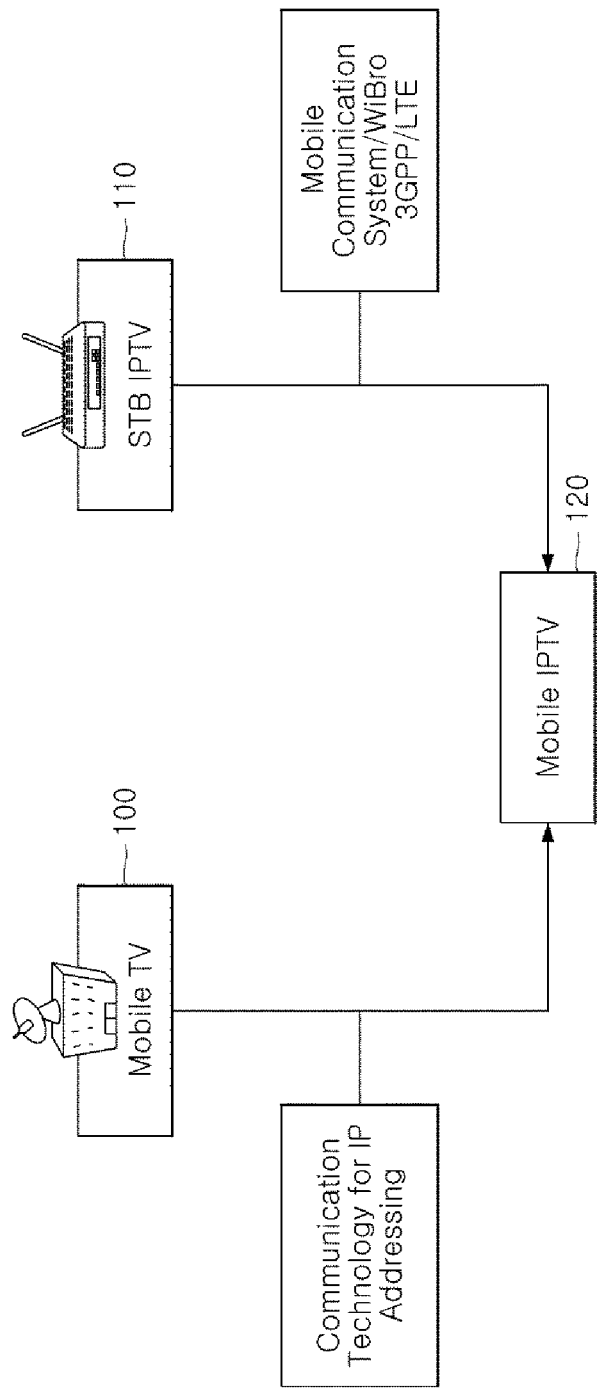
FIG. 1 is a diagram illustrating an example of the configuration of a typical mobile IPTV broadcasting network.
Figure 2:
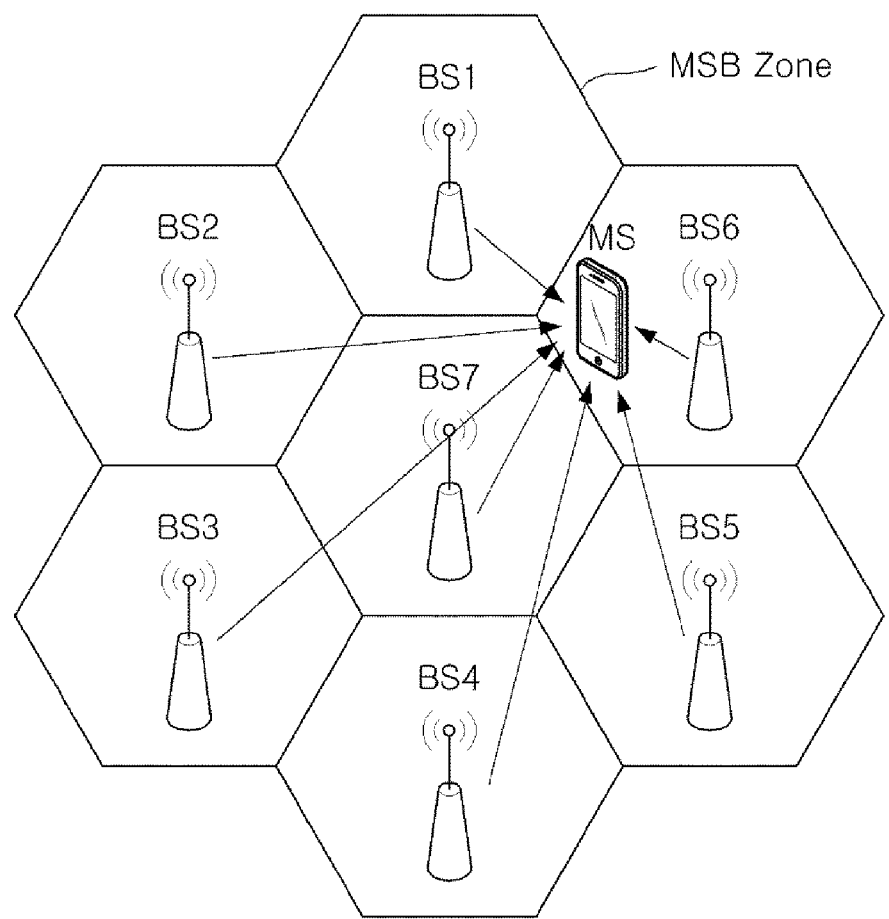
FIG. 2 is a diagram illustrating the configuration of an MBS zone in a related art wireless communication system.
Figure 3:
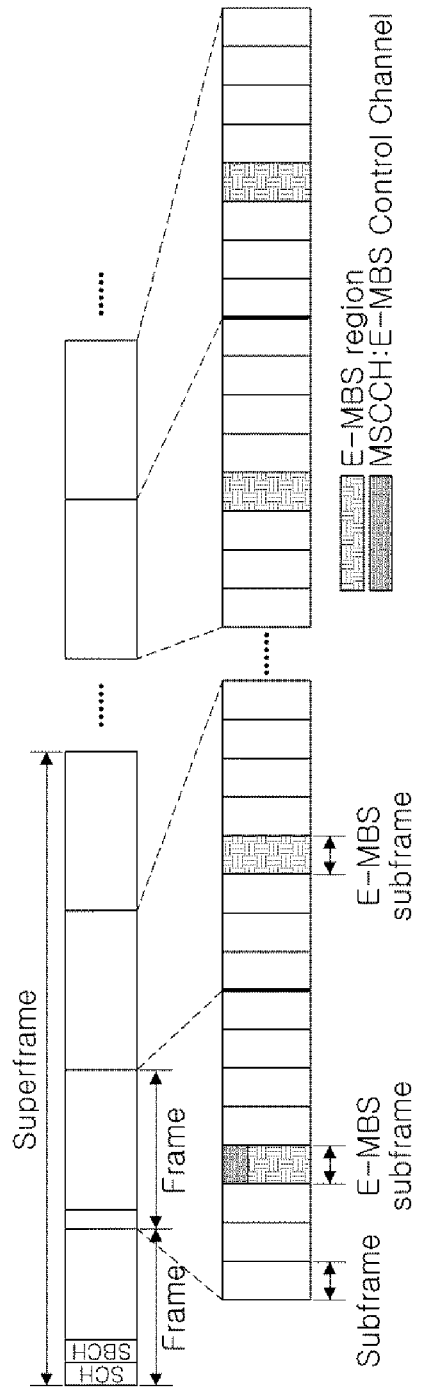
FIG. 3 is a diagram illustrating an example of a frame structure in compliance with IEEE 802.16 in a related art wireless communication system.
Figure 4:
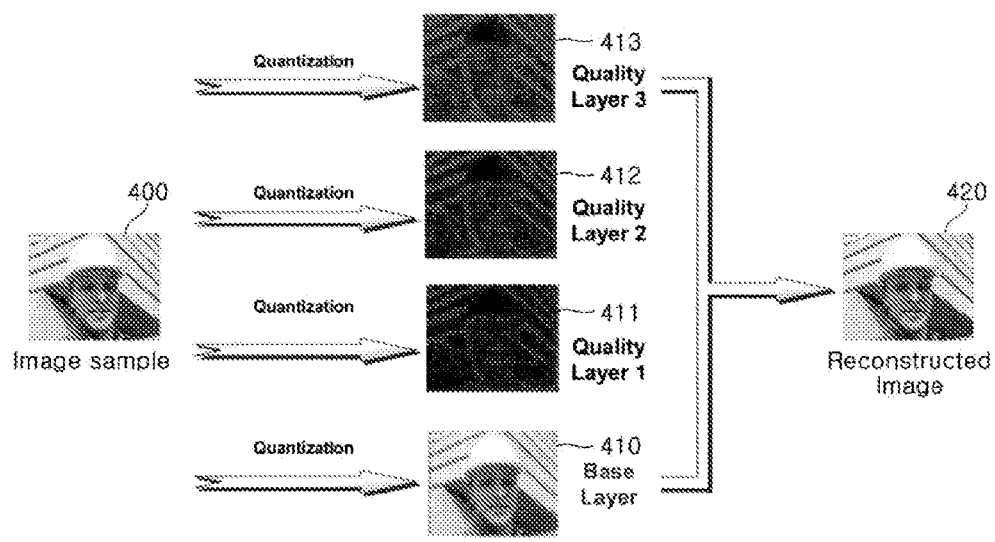
FIG. 4 is a view showing an example of video data to which an SVC technique has been applied, which is related to an embodiment.

FIG. 4 is a view showing an example of video data to which an SVC technique has been applied.

Referring to FIG. 4, a single piece of video data may be quantized into a plurality of layers. Video data 400 may be transmitted in the form of a bit stream, in which the video data 400 has been divided into a base layer 410, and a plurality of enhancement layers 411 to 413. Thus, the video data gets encoded. The base layer is data transmitted across an entire area in which a base station provides service. The base layer is transmitted in a multicast and broadcast manner. The enhancement layers are data transmitted, and classified into layer 1, layer 2, and layer 3 according to the quality of video data. The enhancement layers are transmitted to the base data.

Table 1 shows an example of the bit stream in which video data has been encoded into one or more layers.

TABLE 1

| | Data bit stream to which the SVC has been applied |
|---|---|
| 1 | Base Layer |
| 2 | Base Layer + enhancement Layer 1 |
| 3 | Base Layer + enhancement Layer 1 + enhancement Layer 2 |
| 4 | Base Layer + enhancement Layer 1 + enhancement Layer 2 + enhancement Layer 3 |

Referring to FIG. 4 with reference to Table 1, the image quality of the video data increases in proportion to an addition of the enhancement layers 411 to 413 to base layer 410. When transmitted data is divided into a single base layer and three enhancement layers, and is then encoded into a single bit stream, only the base layer, or the base layer and one or more enhancement layers may be received. Whether only the base layer or the base layer and one or more enhancements are received depends on a performance of a terminal.

When the terminal has received all of the three enhancement layers, the terminal can restore 100% of the data of the single bit stream. Thus, the image quality of restored video data 420 is almost the same as that of video data 400 present before transmission. However, some terminals may utilize part of the bit stream data depending on the terminal performance. When data is transmitted, the same bit stream is transmitted to all users over a wireless communication network, causing overhead.

Figure 5:
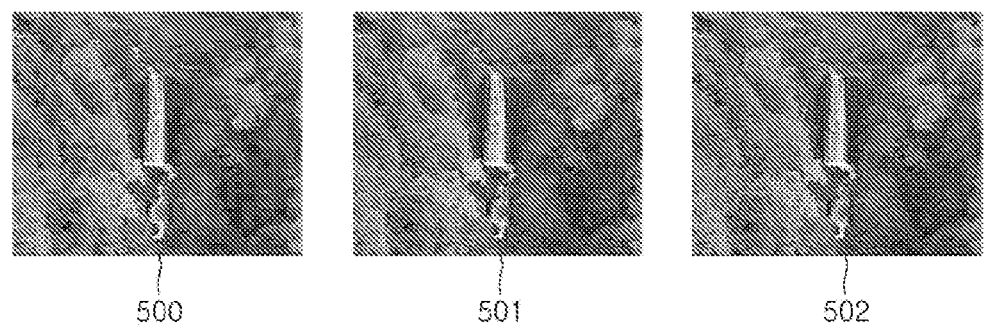
FIG. 5 is a view showing another example of video data to which an SVC technique has been applied, which is related to an embodiment.

FIG. 5 is a view showing another example of video data to which an SVC technique has been applied.

Multimedia data may be divided into a plurality of layers depending on the quality, i.e., layer 0, layer 1, and layer 2. Layer 0 corresponds to a base layer, and layer 1 and layer 2 corresponds to enhancement layers.

Referring to FIG. 5, it can be seen that the quality of data 501 restored using layer 0 and layer 1 is higher than that of data 500 restored using only layer 0. The quality of data 502 restored using layer 0, layer 1, and layer 2 is higher than data 501 using only layer 0 and layer 1 or data 500 restored using only layer 0.

A system for providing MBS service according to an embodiment using an SVC technique will be described with reference to FIG. 6 below.

Figure 6:
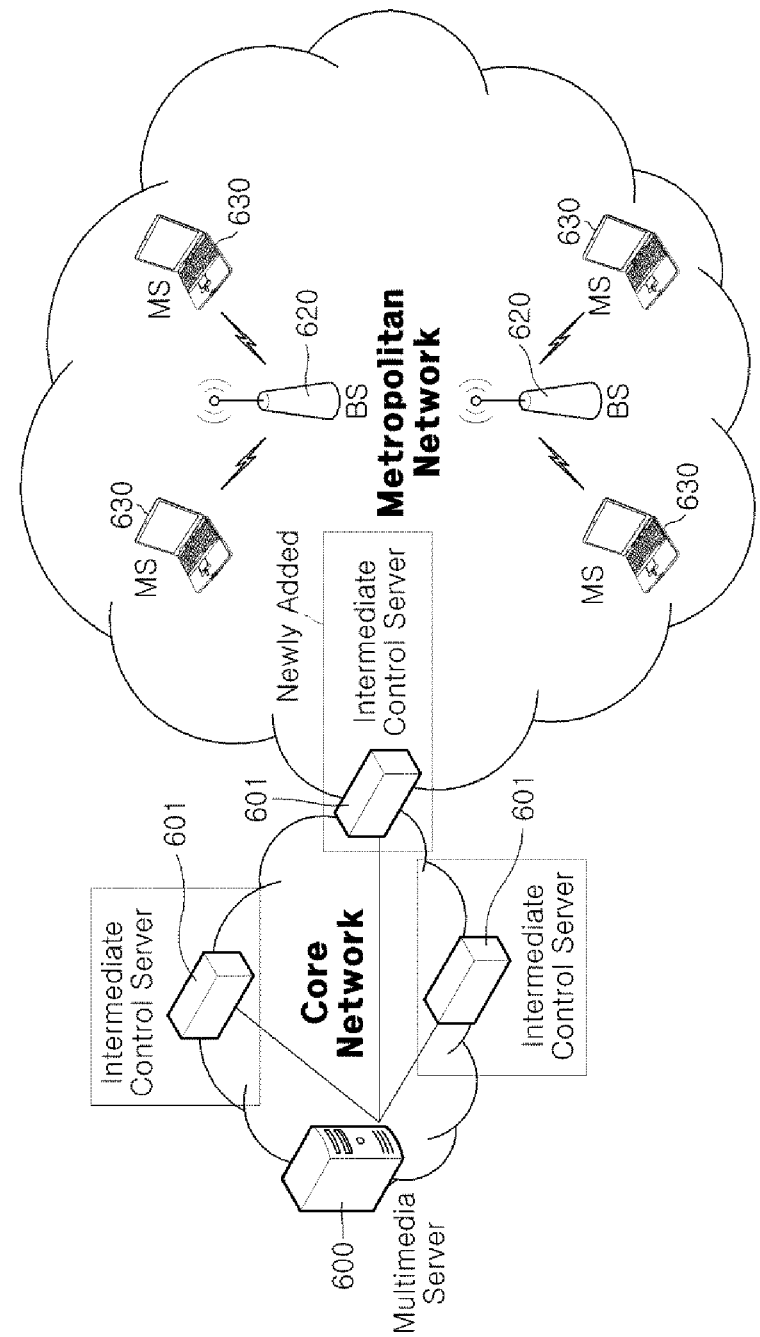
FIG. 6 is a diagram illustrating an example of a wireless network onto which a system for providing MBS service according to an embodiment.

FIG. 6 is a diagram illustrating an example of a wireless network onto which the system for providing MBS service according to an embodiment is applied.

Referring to FIG. 6, the wireless network for providing MBS service includes a core network including servers for providing data packets and a metropolitan network including a plurality of base stations for providing data packets to a plurality of terminals in a MBS zone.

The core network includes a multimedia server 600 for providing multimedia data, and a plurality of intermediate control servers 601. The intermediate control servers 601 divide data packets, received from the multimedia server 600, into a plurality of layers and performing re-packetization.

The intermediate control server 601 divides data packets, received from the multimedia server 600, into a base layer and a plurality of levels of enhancement layers using an SVC technique. The intermediate control server 601 also performs re-packetization while assigning numbers to the respective layers so that the plurality of base stations 620 can identify the layer numbers. Preferably, the intermediate control servers 601 may assign one or more layers depending on the channel status or the performance of a terminal.

Each of the base stations 620, which have received the data packets from the intermediate control servers 601, may variably configure one or more layers for each of the regions of a cell, depending on the performance or channel status. Each of the base stations 620 may also multicast and broadcast the layers to each of one or more terminals located in the cell. Each of the regions of the cell is where the base station provides service.

The base station 620, according to the embodiment, does not multicast and broadcast data packets, received from the intermediate control server 601, without a change. The base station 620 may group terminals, located in the area of the cell, depending on the channel status or performance of the terminals, variably configure one or more layers of video data for each group, and then multicast and broadcast the corresponding layers to the terminals of the group. The base station 620 may transmit layered data packets to a plurality of terminals using an SFN technique.

An SFN technique is a method of transmitting broadcast signals to an adjacent area using the same frequency as an OFDM digital transmission method. When using the same frequency, this technique can reduce inter-cell interference and the frequency of handover. An SFN zone is defined as an area where a plurality of base stations transmits the same data in the same period using the same frequency resource in accordance with the SFN method. In embodiments, the SFN zone is a MBS zone where the MBS service is provided using a SFN technique.

Base stations, which belong to an SFN zone, may utilize the same transmission method (for example, symbol-based synchronization, the same sub-channel, or the same modulation method) and may utilize a high Modulation and Coding Scheme (MCS)-level channel modulation method. Thus, the base stations may not suffer from channel interference when transmitting data. In other words, the data transmission ratio is increased.

Figure 7:
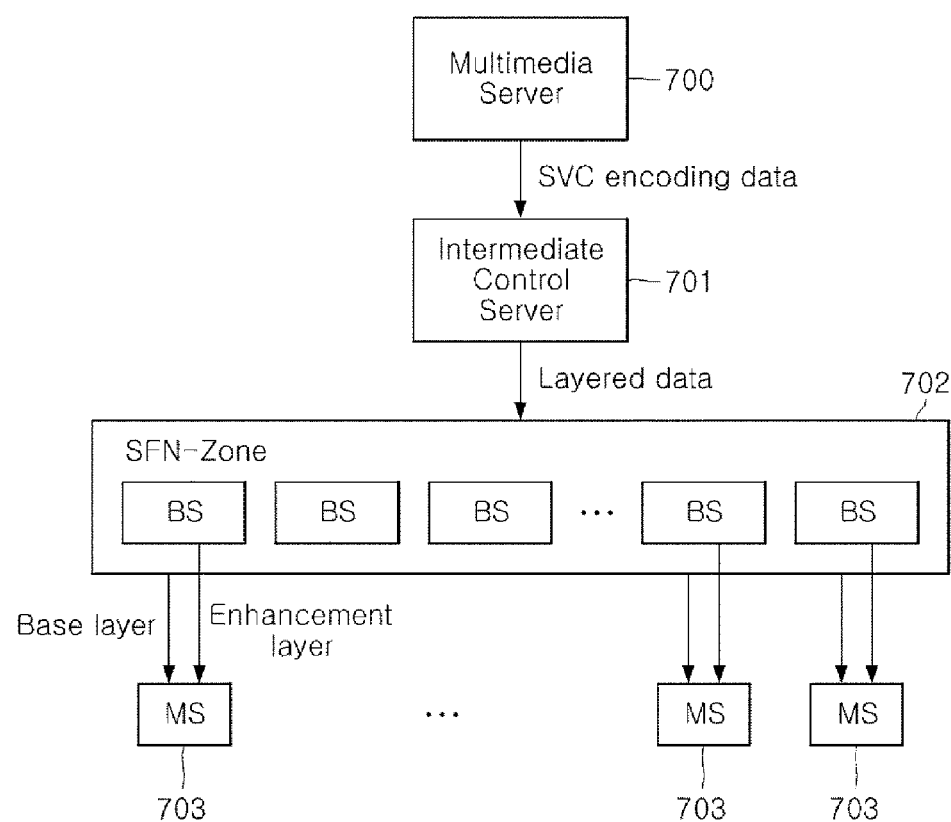
FIG. 7 is a block diagram showing the configuration of a system for providing MBS service according to an embodiment.

FIG. 7 is a block diagram showing the configuration of a system for providing MBS service according to an embodiment. In greater detail, FIG. 7 illustrates the flow of data transmission among the components of the wireless network of FIG. 6.

Referring to FIG. 7, a multimedia server 700 transmits data packets, which have been encoded using an SVC technique, to the intermediate control server 701.

The intermediate control server 701 re-packetizes the received data packets into data packets including a base layer and one or more enhancement layers based on the image quality of the data. The intermediate control server 701 also transmits the re-packetized data packets to a plurality of base stations 702 belonging to an SFN zone.

The plurality of base stations 702, which belong to an SFN zone, multicasts and broadcasts the base layer of the data packets received in a batch to all users who belong to the SFN zone. Since the channel status of all the terminal users located in the SFN zone is desirable, the higher AMC level can be applied. Therefore, the base layer can guarantee a minimum image quality to the terminals which have received the base layer. Moreover, each of the base stations 702 adaptively multicasts and broadcasts one or more enhancement layers to some of the users who are present in each cell or sector. Depending on the channel status or terminal performance, the user may belong to the SFN zone. Although in FIG. 7, all of the base stations 702 transmit enhancement layers to terminals 703, the transmission of the enhancement layers and the level of enhancement layers transmitted may vary depending on the channel environment or performance of each of the terminals.

Figure 8:
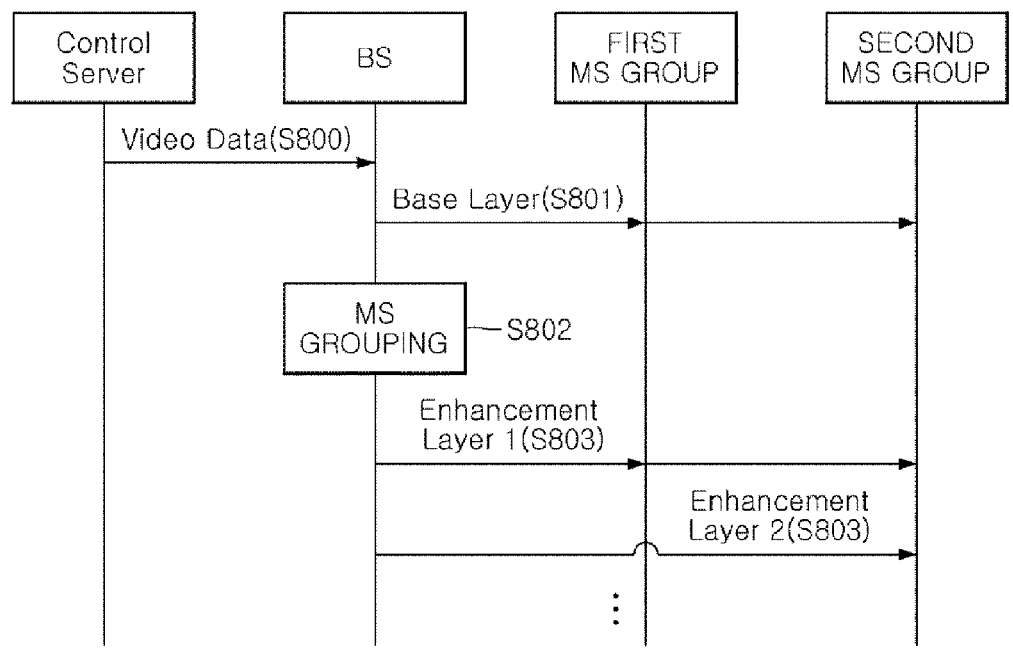
FIG. 8 is a flowchart illustrating an example of a process of providing MBS service using an SFN technique according to an embodiment.

FIG. 8 is a flowchart illustrating an example of a process of providing an MBS service using an SFN technique according to an embodiment.

In FIG. 8, a control server includes one or more intermediate control servers, and a base station BS is any of a plurality of base stations belonging to an SFN zone. Furthermore, each of first and second MS groups is a terminal group including one or more terminals. One or more terminals are in a cell or a sector where the base station provides service and which belongs to an SFN zone.

Referring to FIG. 8, the base station belonging to the SFN zone provides video data packets in the form of an MBS service in order to provide IPTV service and receive data packets. The data packets include a base layer and a plurality of enhancement layers. The base station receives data packets from the intermediate control server at operation S800.

At operation S801, the base station multicasts and broadcasts the base layer of the received data packets across the entire area of the cell. Accordingly, all of the users belonging to the SFN zone can be guaranteed a minimum image quality.

Furthermore, at operation 802, the base station groups terminals in order to adaptively transmit one or more enhancement layers to terminals located in the area of the cell depending on the channel status or performance thereof.

For example, when grouping is performed based on the channel status, the base station may select terminals whose channel status falls within a status range among the terminals. The terminals are in the area of the cell and belong to the SFN zone. The base station may also group select terminals into a single group. In other words, as shown in FIG. 8, terminals whose channel status falls within a status range may be selected and grouped into a first terminal group, and terminals whose channel status is higher than that of the first terminal group may be selected and grouped into a second terminal group.

The base station may also group terminals based on the specification (or performance) of the terminals. For example, when the terminal of a user can restore only a base layer and enhancement layer 1, enhancement layer 2 transmitted by the base station would be unnecessary. Enhancement layer 2 would be unnecessary even when the channel status of the corresponding user is desirable and sufficient to receive enhancement layer 2. Accordingly, it is preferable to exclude the terminal even when the terminal has a channel status sufficient to belong to the second terminal group.

During the process of grouping, the number of groups may be arbitrarily determined by the base station or may be determined based on the number of enhancement layers included in received data packets. Meanwhile, since groups of terminals are constructed based on the channel status, the second terminal group may be included in the first terminal group.

At operation S803, the base station, which has performed grouping, assigns enhancement layer 1 to the first terminal group in a multicast manner. Since the first terminal group is a group of terminals having good channel status, the base station may transmit enhancement layer 1 using a high AMC level.

At operation S804, enhancement layer 2 is assigned to the second terminal group within the cell in a multicast manner. Since the second terminal group includes terminals whose channel status is better than the other terminals in the first terminal group, the base station may apply an AMC level. The AMC level is higher than the AMC level applied when enhancement layer 1 is transmitted to the first terminal group.

Although FIG. 8 illustrates the first and second terminal groups located in the area of the cell where the base station provides service, embodiments are not limited. A larger number of groups may be constructed depending on the number of enhancement layers or other conditions.

Figure 9:
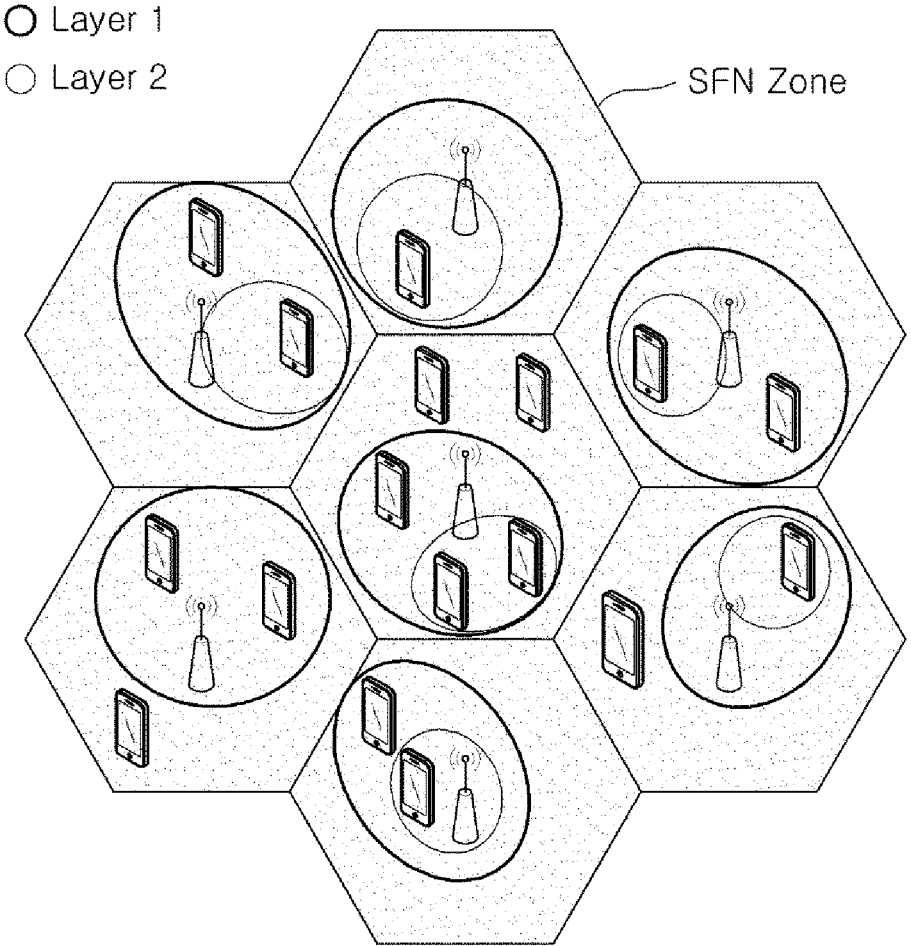
FIG. 9 is a diagram illustrating an example of an SFN zone, which was illustrated in FIG. 8, in which data to which SVC has been applied is provided using an MBS service, according to an embodiment.

FIG. 9 is a diagram illustrating an example of an SFN zone using an MBS service in which SVC has been applied to data.

In FIG. 9, the SFN zone includes 7 cells, and service is provided to each of the cells by a single base station. Although not shown in FIG. 9, each of the base stations receives layered data packets from a multimedia server, and multicasts a base layer (layer 0) included in the data packets. Each of the base stations multicasts a base layer (layer 0) to an SFN zone via an intermediate control server. Accordingly, since all terminals located in the SFN zone shown in FIG. 9 can receive the base layer, the terminals are guaranteed the minimum image quality.

Furthermore, after performing the process of grouping illustrated in FIG. 8, each of the base stations transmits enhancement layer 1 (layer 1) to the terminals of a first terminal group, and transmits enhancement layer 2 (layer 2) to the terminals of a second terminal group. The second terminal group includes terminals selected from the first terminal group.

Meanwhile, when a SINE value is very low, data may be assigned to terminals located in the boundary region of the SFN zone. Data may be assigned to terminals located in the boundary regions of the SFN zone in a unicast manner using a multi-base station MIMO defined in IEEE 16m.

In accordance with the above-described embodiments and with regard to data packets divided into a base layer and enhancement layers and encoded, the base station transmits the base layer in an SFN manner. The base station also adaptively provides the enhancement layers in the form of an MBS service based on the channel status and terminal performance. Thus, the flexibility of a frequency band and the efficiency of data transmission are increased.

Figure 10:
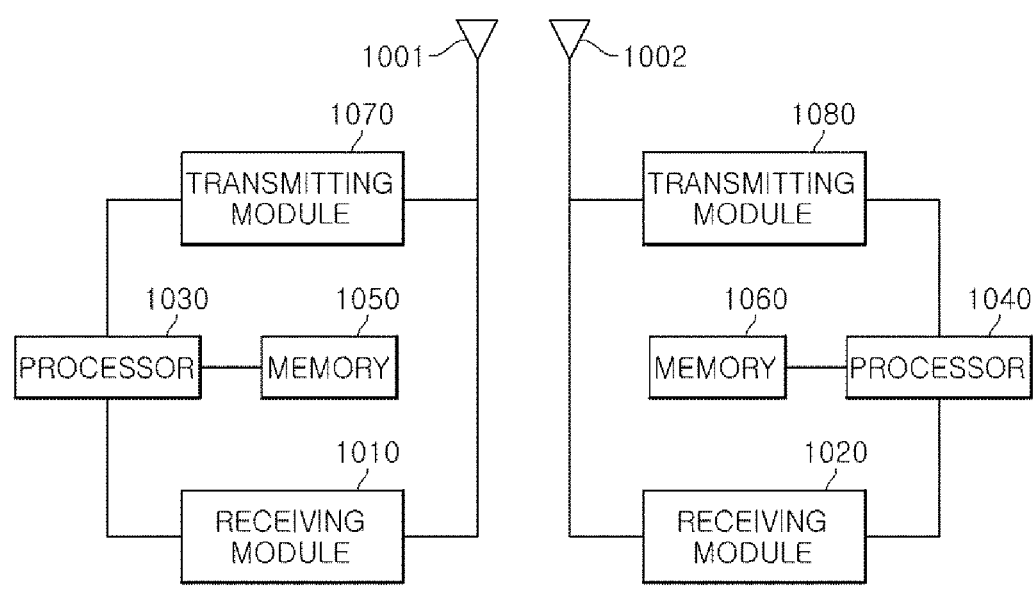
FIG. 10 is a block diagram illustrating a base station and a terminal in which embodiments can be implemented.

FIG. 10 is a block diagram illustrating a base station and a terminal in which embodiments can be implemented. It is assumed that the illustrated base station and terminal belongs to an SFN zone. Also, data to which an SVC technique has been applied is transmitted and received.

The terminal may operate as a transmitting device in an uplink. The terminal may operate as a receiving device in a downlink. Furthermore, the base station may operate as a receiving device in an uplink. The base station may operate as a transmitting device in a downlink. In other words, the terminal and the base station may each include a transmitting device and a receiving device which are used to transmit and receive data.

The transmitting device and the receiving device may each include a processor, a module, and a means used to implement the embodiments. In particular, the transmitting device and the receiving device may include a module (i.e., means) for encrypting messages, a module for interpreting encrypted messages, and an antenna for transmitting and receiving messages.

Referring to FIG. 10, the left side illustrates the structure of a transmitting device, i.e., the base station. The right side of FIG. 10 illustrates the structure of a receiving device, i.e., a terminal which has entered a cell where the base station provides service. Each of the transmitting device and the receiving device may include an antenna 1001 or 1002, a receiving module 1010 or 1020, a processor 1030 or 1040, a transmitting module 1070 or 1080, and memory 1050 or 1060.

Each of the antennas 1001 and 1002 includes a receiving antenna for receiving wireless signals from the external environment and transferring them to the receiving module 1010 or 1020, and a transmitting antenna for transmitting signals, generated by the transmitting module 1070 or 1080, to the external environment. When MIMO functionality is supported, each of the antennas 1001 and 1002 may include two or more antennas.

Each of the receiving modules 1010 and 1020 may restore wireless signals, received from the external environment via the antenna, to original data by decoding and demodulating the received signals. Each of the receiving modules 1010 and 1020 may then transfer the restored data to the processor 1030 or 1040. Unlike FIG. 10, the receiving module and the antenna may be implemented as a single receiving unit. The single receiving unit may be used to receive wireless signals.

Each of the processors 1030 and 1040 control the general operation of the transmitting device or receiving device. In particular, each of the processors 1030 and 1040 may perform controller functionality for performing the above-described embodiments, Medium Access Control (MAC) frame variable control functionality based on service characteristics and a radio wave environment, handover functionality, and authentication and encryption functionality.

Each of the transmitting modules 1070 and 1080 may perform predetermined coding and modulation on data which has been scheduled by the processor 1030 or 1040 and will be transmitted to the external environment. Each of the transmitting modules 1070 and 1080 may also transfer the data to the antenna. Unlike FIG. 10, the transmitting module and the antenna may be implemented as a single transmitting unit. The single transmitting unit is used to transmit wireless signals.

Each of the memory 1050 and 1060 may store programs used to help the processing and control of the processors 1030 and 1040. Each of the memory 1050 and 1060 may perform the functionality of temporarily storing input and output data (in the case of a mobile terminal, a UL grant assigned by a base station, system information, a station identifier (STID), a flow identifier (FID), operating time, etc.)

Furthermore, each of the memory 1050 and 1060 may include at least one type of storage medium selected from among flash memory, a hard disk, a micro-type multimedia card, card-type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

The processor 1030 of the transmitting device performs the general control of the base station. The processor 1030 may group terminals located in a cell where the transmitting device provides service, into one or more groups depending on the channel status or terminal specifications.

Furthermore, the processor 1030 of the transmitting device may adaptively configure one or more layers of data packets for each group of terminals or each region of a cell and then transmit the layers of data packets. In other words, as described in detail above in conjunction with FIGS. 7 to 9, a base layer may be transmitted to the cell in an SFN manner, and one or more enhancement layers are multicast to each group of terminals.

The data packets layered for each terminal or each group of terminals by the processor 1030 of the transmitting device are transmitted to the transmitting device via the transmitting module 1070 of the transmitting device.

The processor 1040 of the transmitting device performs the general control of the terminal, restores the data packets received from the receiving module 1020, and outputs image data via a display unit. Data packets which are received by a transmitting device may vary depending on the channel environment and image data output specifications of the transmitting device.

Meanwhile, the base station may perform each of controller functionality, Orthogonal Frequency Division Multiple Access (OFDMA) packet scheduling, Time Division Duplex packet scheduling and channel multiplexing functionality, service characteristics and radio wave environment-based MAC frame variable control functionality, high-speed traffic real-time control functionality, handover functionality, authentication and encryption functionality, packet modulation and demodulation functionality for transmission of data, high-speed packet channel coding functionality, and real-time modem control functionality. The base station may perform the above-described embodiments, using at least one of the above-described modules, or may further include additional means, an additional module or an additional portion which can perform each of the above-described functionalities.

In accordance with the embodiments, there is provided a method and system for efficiently transmitting data to which scalable image coding has been applied over a single frequency network. The single frequency network is capable of, when providing MBS service, providing optimized Quality of Service (QoS) to users while efficiently and flexibly utilizing a frequency resource.

In detail, there is provided a method and system for efficiently transmitting data, to which scalable image coding has been applied, over a single frequency network. The single frequency network is capable of, when providing MBS service, dividing a video data resource into a plurality of layers (a base layer and one or more enhancement layers) using an SVC technique and allowing each base station to flexibly transmit data. Thus, according to embodiments, the data transfer rate is improved and there is efficient use of the frequency band.

Although the exemplary embodiments have been disclosed for illustrative purposes, those skilled in the art will appreciate that various modifications, additions and substitutions are possible, without departing from the scope and spirit of embodiments as disclosed in the accompanying claims.

What is claimed is:

1. A method of providing multicast and broadcast service in a system including a base station, the system multicasting and broadcasting data to which scalable video coding has been applied, the method comprising:
    grouping a plurality of terminals, located in an area of a cell, into at least one terminal group depending on channel status or performance of the plurality of terminals; and
    adaptively modulating and channel-coding a scalable bit stream, to which scalable video coding has been applied, depending on channel status or terminal performance of the at least one terminal group and transmitting the bit stream;
    wherein the scalable bit stream comprises a base layer multicast across the area of the cell and one or more enhancement layers selectively transmitted depending on the channel status or the terminal performance of the at least one terminal group.

2. The method of claim 1, further comprising:
    encoding by a control server of the system, image data received from a multimedia server of the system, into the scalable bit stream; and
    transmitting by the control server, the scalable bit stream to the base station.

3. The method of claim 1, wherein the base station multicasts and broadcasts the base layer across the area of the cell using an identical resource and an identical channel modulation method at an identical time.

4. The method of claim 1, wherein when the base station transmits the enhancement layers, the base station transmits overlaid enhancement layers, a number of enhancement layers being proportional to the channel status of the at least one terminal group.

5. A system for multicasting and broadcasting data to which scalable video coding has been applied, the system comprising:
    a control server which re-packetizes data packets, received from a multimedia server, into a scalable bit stream by separately encoding the data packets into a base layer and one or more enhancement layers; and at least one base station which adaptively multicasts and broadcasts the scalable bit stream, received from the control server, to a plurality of terminals located in an area of a cell;

wherein the at least one base station multicasts and broadcasts the base layer across the area of the cell, and adaptively transmits the one or more enhancement layers depending on channel status or terminal performance of the plurality of terminals.

6. The system of claim 5, wherein the at least one base station groups the plurality of terminals, located in the area of the cell, into at least one terminal group depending on the channel status or the performance of the plurality of terminals.

7. The system of claim 6, wherein the at least one base station transmits overlaid enhancement layers, the number of enhancement layers being proportional to the channel status of the at least one terminal group.

8. The system of claim 5, wherein the at least one base station multicasts and broadcasts the base layer across the area of the cell using an identical resource and an identical channel modulation method at an identical time.

9. A base station for multicasting and broadcasting data to which scalable video coding has been applied, the base station comprising:

a transmitting module which transmits data;

a receiving module which receives a scalable bit stream to which the scalable video coding has been applied; and a processor which groups a plurality of terminals, located in an area of a cell where the base station provides service, into at least one terminal group depending on channel status or performance of the terminals, and which adaptively modulates and channel-codes the scalable bit stream depending on channel status or performance of at least one terminal group;

wherein the scalable bit stream comprises a base layer multicast across the area of the cell and one or more enhancement layers selectively transmitted depending on channel status or terminal performance of the at least one terminal group.

10. The base station of claim 9, wherein the processor multicasts and broadcasts the base layer across the area of the cell via the transmitting module using an identical resource and an identical channel modulation method at an identical time.

11. The base station of claim 9, wherein the processor transmits overlaid enhancement layers, a number of enhancement layers being proportional to the channel status and the performance of the at least one terminal group.

* * * * *